UNITED STATES PATENT OFFICE.

EDWARD A. MARTIN, OF VIRGINIA CITY, NEVADA.

FIRE-BRICK COMPOUND.

SPECIFICATION forming part of Letters Patent No. 258,661, dated May 30, 1882.

Application filed April 1, 1882. (No specimens.)

*To all whom it may concern:*

Be it known that I, EDWARD A. MARTIN, of Virginia City, county of Storey, State of Nevada, have invented an Improved Fire-Brick Compound; and I do hereby declare the following to be a full, clear, and exact description thereof.

My invention relates to a new and useful composition of matter suitable for and forming a fire-brick.

My composition consists of the following ingredients, combined in about the proportions stated, viz: silica, ninety-five and one-half per cent.; potash or soda, two and one-half per cent.; lime, two per cent. These, when mixed and subjected to a baking-heat, form a tough and refractory mass, very suitable for fire-brick.

I am aware that silica has been used as the principal ingredient of fire-brick compounds, but never successfully with potash, soda, or lime, because in the proportions in which these latter were used—namely, a very large proportion—the refractory quality of the silica was destroyed and a fusible compound resulted; but by using a very great proportion of silica and a small proportion of potash, soda, or lime I retain the valuable quality of the silica and still have suitable ingredients to hold the silica together and produce a tough mass.

The addition of the lime, as hereinbefore shown, is optional, and depends upon the particular qualities I wish the compound to possess. For example, if I want a brick which will be tough and hard, not liable to become broken in transportation, and practically infusible even at a white heat, I use the ingredients and in the proportions substantially as before stated. If I want a brick which, while not having such a degree of hardness and toughness as the preceding, is yet more refractory, I may omit the lime and increase the percentage of silica to ninety-seven and one-half. This compound at a red heat has a degree of hardness between that of the same compound at a white heat and that of the first compound at a white heat.

The use of such a large proportion of silica enables me to vary the qualities of the compound as described without destroying its main quality or adaptability for a fire-brick.

Having thus described my invention, what I claim as new, and desire to secure by Letters Patent, is—

The herein-described composition of matter suitable for and forming fire-brick, consisting of silica, potash, or soda and lime, in substantially the proportions specified.

In witness whereof I hereto set my hand.

EDWARD A. MARTIN.

Witnesses:
JOSEPH V. MCCURDY,
JOSEPH H. MATHEWSON.